United States Patent [19]
Eiler

[11] 3,822,791
[45] July 9, 1974

[54] MOBILE CRANE
[75] Inventor: Peter Eiler, Dusseldorf-Benrath, Germany
[73] Assignee: Gottwald Leo K. G., Dusseldorf, Germany
[22] Filed: Aug. 7, 1972
[21] Appl. No.: 278,204

[30] Foreign Application Priority Data
Aug. 11, 1971  Germany............................ 2140233

[52] U.S. Cl. ................................................ 212/49
[51] Int. Cl. ............................................ B66c 23/72
[58] Field of Search ......... 212/48, 49, 35; 212/35 R

[56] References Cited
UNITED STATES PATENTS
2,082,889  6/1937  Hight .................................. 212/49
2,397,271  3/1946  Ladwig ............................ 212/35 R FOREIGN PATENTS OR APPLICATIONS
211,297    2/1967   Sweden ............................... 212/49
2,018,819  11/1970  Germany ............................. 212/49
1,403,011  4/1964   France ................................ 212/49
38,572     7/1965   Germany ............................. 212/49

Primary Examiner—Richard A. Schacher
Assistant Examiner—Hadd S. Lane
Attorney, Agent, or Firm—Toren and McGeady

[57]  ABSTRACT

A mobile crane comprises a multi-axle chassis carrying a slewing frame with a luffing jib mounted on the frame. There is also a single or multi-axle trailer having, between its axles, or above its single axle when there is only one, a device for supporting a counterweight and also for supporting the jib when the jib is in a lower travelling position. Means are provided for supporting the counterweight from the peak of the jib behind the supporting device on the trailer when the jib is in its lowered travelling position so that the jib acts as a lever pivoted on the trailer and the counterweight applies a lifting force to the chassis through the slewing frame so that the axle loads of the chassis are decreased and the axle load or loads of the trailer are increased.

10 Claims, 3 Drawing Figures

MOBILE CRANE

This invention relates to mobile road-travelling cranes comprising a multi-axle chassis carrying a slewing frame, a luffing jib mounted on the frame and a single or multi-axle trailer having between its axles, or above its single axle, a device for supporting a counterweight and also for supporting the jib when this is in a lowered travelling position.

For mobile cranes of this kind regulations set upper limits on the permissible axle loads. With large mobile cranes these regulations have the result that the cranes have to be constructed with a large number of axles, up to nine axles having hitherto been used. The cranes are consequently costly in construction. A further disadvantage involved is that the static loading cannot be evenly distributed and, particularly when the crane is travelling over uneven ground, unpredictable load distributions occur, loading the individual axles in uncontrollably different ways. A still further disadvantage is that a mobile crane with such a large number of axles cannot in practice be steered with precision and there is a tendency for the non-steered wheels to be dragged sideways.

Attempts have been made, in order to overcome these disadvantages, to provide a hydraulic or mechanical compensation system, but this has proved not only very costly but has also required excessive maintenance. Moreover even in the case of a compensated system the disadvantage remains that if more than four axles are used the load distribution on the axles during negotiation of uneven roads and bumpy ground cannot be exactly calculated. The loads applied to some of the axles can easily exceed the permissible limits, resulting in damage in the course of time, unless an excessively heavy construction is used. In any case the multi-axle chassis have lengths of approximately 15 metres and this restricts the range of use of the crane intolerably. It is necessary to keep the supporting parts of the chassis as short as possible, not only for reasons of cost but also in order to retain a reasonable ratio of chassis length to chassis width. This requirement inevitably clashes with the regulations limiting axle loads in that it becomes essential to use such a large number of axles that the difficulties described above inevitably arise.

In the construction of multi-axle mobile cranes of the kind described these problems are overcome to a certain extent by supporting the counterweight, which is necessary for the operation of the crane and which constitutes an appreciable proportion of the total weight of the crane, on a trailer. The trailer has a supporting device for supporting the counterweight and the supporting device is also used for supporting the crane jib when the crane is travelling on the road. The part of the jib projecting backwards behind the supporting device applies a certain amount of lift, by leverage, to the foot of the jib and so to the slewing frame thus reducing the load on the crane chassis and on its axles. However for this lift to reach a significant magnitude it is necessary to extend the peak of the jib far back behind the supporting device on the trailer. This involves the considerable disadvantage that the projecting length of jib can exceed the legal limits and in any case reduces the manoeuvrability of the combined vehicle during transportation.

The object of the present invention, is to provide a crane of the kind described which while satisfying regulations with regard to axle loads is nevertheless manoeuvrable and has reduced chassis dimensions. To this end, according to this invention, in such a crane, means are provided for supporting the counterweight from the peak of the jib behind the supporting device on the trailer when the jib is in its lowered position.

Thus the counterweight reduces the load on the chassis and reduces the axle loads of the chassis to enable them to be kept below officially permitted limits by transferring weight from the crane chassis to the trailer. The counterweight is suspended at a point which is situated considerably behind the supporting point where the jib is supported on the trailer and consequently the counterweight acts on the end of a lever, producing a substantial torque which applies a lift to the jib foot.

The arrangement not only allows the crane chassis to be constructed with fewer axles than would otherwise be necessary but also gives the crane improved manoeuvrability both when it is travelling along a road and when it is working on the site of operations. When the crane is travelling along a road it behaves as though there are two separate vehicles. Moreover the trailer can if desired be equipped with steerable axles. When the crane is working on a site, on the other hand, advantages are obtained in that the crane chassis can be considerably shorter than otherwise necessary because under these circumstances the regulations governing axle loads for a vehicle travelling along the road do not apply. The axle loads permissible at a construction site can be considerably higher. A further advantage obtained by providing a chassis and trailer is that each part can be constructed specifically for its own purpose. For example the trailer chassis, which has no driving axle, can be constructed exclusively to suit road conditions and can consequently have tyres of considerably smaller diameters.

In order to make the combined vehicle, consisting of the crane chassis and the trailer, behave safely on the road, including when negotiating the corners, the supporting device on the trailer for supporting the jib and through it the counterweight preferably comprises an upwardly projecting supporting frame with an upright bore for receiving a pin projecting from a supporting yoke attached to the underside of the jib. With this arrangement and because the slewing frame which supports the foot of the jib is free to rotate on the crane chassis, it is ensured that the combined vehicle can negotiate even comparatively tight corners on the road without excessive sideways forces being applied to the trailer by the jib.

The same degree of manoeuvrability is alternatively obtained, according to a further feature of the invention, by making the supporting device itself as a supporting yoke which is rotatable on the trailer about a vertical axis and is arranged to be attached to the jib.

In the example of the invention in which a connecting pin is used, the jib, after lowering into a horizontal position, is secured to the supporting frame by introducing the pin into the bore in the supporting frame and locking the pin axially in position in the bore while leaving it free to rotate. In the second example on the other hand, the lowered jib is secured to the trailer by fixing the jib to the supporting yoke, which is pivoted on the trailer.

The invention makes it possible to construct large cranes with, for example, telescopic jibs with very few axles. Furthermore in the crane in accordance with the invention the axis of the slewing frame is preferably positioned centrally with respect to the crane chassis and with respect to supporting feet for the chassis. Consequently the crane load is applied symmetrically with respect to the chassis as seen in plane.

An example of a crane constructed in accordance with the invention is illustrated diagrammatically in the accompanying drawings in which.

Figure 1:
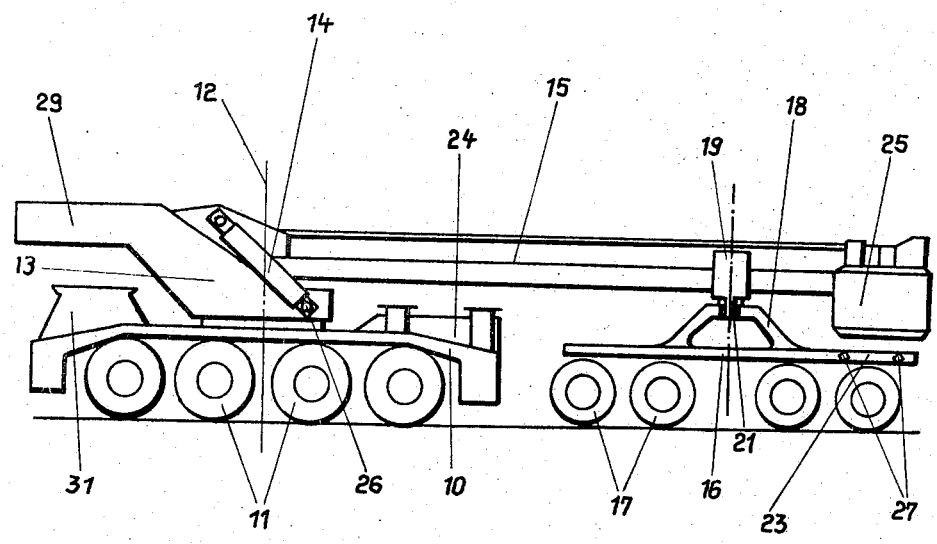
FIG. 1 is a side elevation of the crane with its jib lowered in its travelling position.

As shown in FIG. 1, the crane comprises a crane chassis 10 with a number of axles carrying wheels 11. The crane chassis supports a slewing frame 13 which turns about a vertical axis 12. A telescopic jib 15 with hydraulic luffing cylinders 14 is mounted on the slewing frame 13 and is pivotable about a horizontal axis. Coupled to the crane chassis 10 is a trailer 16 with tyred wheels 17. The trailer is used only for transportation on the road and is therefore constructed only for this purpose. In particular the tyred wheels 17 are considerably smaller in diameter than those of the crane chassis 10.

Figure 2:
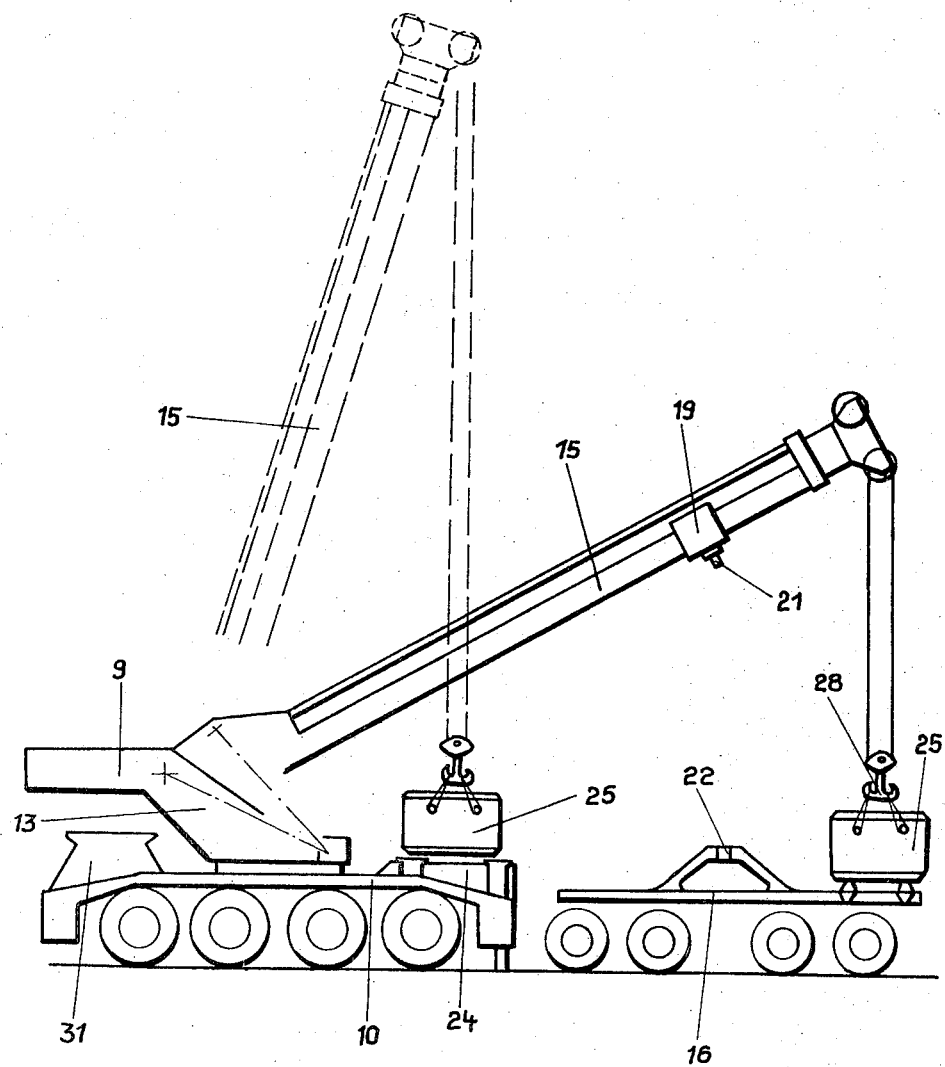
FIG. 2 is a side elevation of the crane with the jib in an intermediate position during preparation for operation; and, FIG. 3 is a side elevation of the crane ready for operation but with the jib in a lowered operating position.

As shown in FIG. 1, during transportation on the road, the jib 15 is attached to and rests on a supporting frame 18 on the trailer 16. The outer end of the jib is substantially within the vertical projection of the trailer. In the example shown a supporting yoke 19 is fixed to the underside of the jib 15 and has a downwardly projecting pin 21 which fits in an upright bore 22 in the top of the supporting frame 18. If desired the supporting yoke 19 can, as shown in FIG. 2, remain attached to the jib when the crane is working. Alternatively if desired a somewhat similar supporting yoke can be mounted on the supporting frame 18 so that it can pivot about a vertical axis. The jib is then temporarily secured to the yoke when the jib is in the position shown in FIG. 1. In either case the arrangement allows the jib to pivot, relative to the trailer 16, about a vertical axis, for example when a bend in the road is being negotiated during transportation. This gives the crane outstanding manoeuvrability. The pin 21 also has sufficient freedom of movement relative to the trailer, for example by means of a ball joint, to allow relative movements between the crane chassis and the trailer in the vertical plane.

Figure 3:
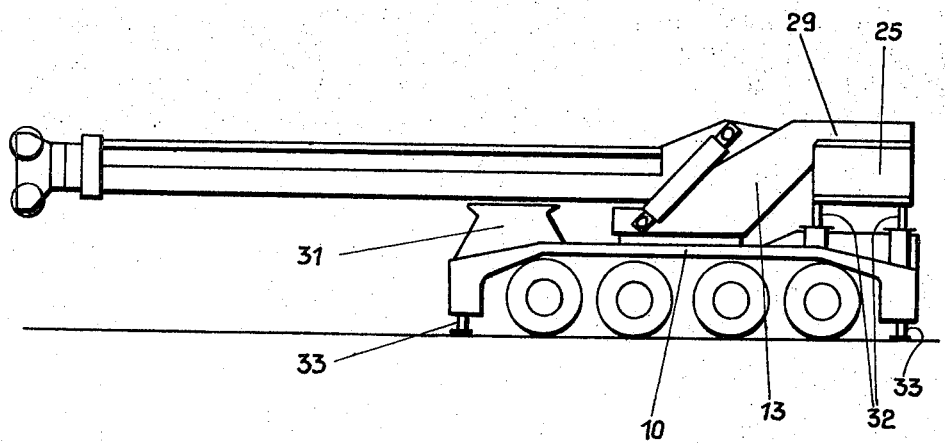

At its rear or aft end, furthest from the crane chassis 10, the trailer has a supporting pad 23 the function of which will be described below with reference to FIGS. 2 and 3. The aft end of the crane chassis 10 also has a similar supporting pad 24.

When the crane is ready for the road, as shown in FIG. 1, a counterweight 25 is suspended, by means which are not shown in the drawing, from the peak of the jib, the counterweight 25 being suspended clear of the surface of the pad 23. The counterweight 25 is suspended from the jib a considerable distance behind the supporting yoke 19 and consequently its weight applies a clockwise torque to the jib as seen in FIG. 1, tending to lift the foot of the jib and the slewing frame 13, with enough leverage to reduce considerably the load on the crane chassis 10. The arrangement improves the load distribution on the crane chassis and trailer in two ways in that the crane chassis 10 is not only relieved of the weight of the counterweight 25 but is also relieved of a considerable load, which is transferred to the trailer, due to the method used for supporting the jib and the counterweight on the trailer.

In order to give the entire vehicle the necessary flexibility to negotiate uneven ground and, in particular to prevent undesired stresses from being applied to the jib and to the slewing frame, lower pivot bearings 26 for the hydraulic cylinders 14 are arranged so that they can be shifted in position on the slewing frame 13, to allow the jib to pivot downwards into a position below the horizontal. Subsequently before the crane is put to work at a construction site the bearings 26 are returned to their normal positions and are securely locked in place.

Starting with the parts in the positions shown in FIG. 1, the crane is prepared for operation as follows: When the crane has arrived at the site, lifting devices 27 mounted on the trailer 16 near the supporting pad 23 are made ready for use. In the present example each lifting device 27 is a form of scissors jack consisting of a parallel motion linkage of spreading struts which always retain their parallel relationship, changing their angles relative to each other only at their connecting points. The linkage allows heavy loads to be lifted using comparatively small lifting forces. The lifting devices 27 are raised until they come into contact with the underside of the counterweight 25, whereupon the counterweight is detached from the jib 15, which is then raised approximately into the position shown in full lines in FIG. 2. The counterweight 25 is then suspended from hooks 28 of the jib and the jib is raised approximately into the position shown in broken lines in FIG. 2, bringing the counterweight 25 into position above the pad 24 of the crane chassis 10. The counterweight is then lowered onto the pad 24. After unhooking the counterweight from the hooks 28, the slewing frame 13 is rotated through 180° about its axis 12. This brings a beam 29 on the slewing frame 13 into the position shown in FIG. 3, allowing the counterweight to be attached without difficulty to the beam.

In the example illustrated, a crane operator's cabin 31 is situated between the front wheels of the crane chassis 10, partly to give the crane a low centre of gravity and partly to allow the jib to swing around over the top of the cabin, even when the jib is in its lowered position. To ensure that the counterweight 25 can also swing around over the top of the operator's cabin 31, bearing in mind the dimensions of a counterweight suitable for large telescopic cranes of the kind illustrated, the support pad 24 is preferably also provided with lifting devices 32 for raising the counterweight 25 before it is attached to the beam 29. This ensures that the counterweight 25 does not foul the top of the cabin 31 when the jib is slewed. After lowering stabilising feet 33 the crane is ready for operation.

The invention makes it possible to construct a large telescopic crane which has a comparatively short chassis but nevertheless satisfies regulations relating to permissible axle loads. Further, the crane can be arranged so that it can be set up ready for operation extremely rapidly.

I claim:

1. In a mobile crane including a chassis, a plurality of axles supporting said chassis, at least two wheels supporting each of said chassis axles, a slewing frame pivotally mounted on said chassis, a luffing jib comprising a body having a first and a second end, said jib being pivotally mounted on said frame at said first end, a trailer, at least one axle supporting said trailer, at least two wheels on said trailer axle, a detachable counterweight attachable to the rear of said slewing frame, means for supporting said counterweight at the rear of said trailer, and means on said trailer above said trailer axle, for supporting said jib at a point thereon intermediate said first and second ends when said jib is in a lowered generally horizontal travelling position, said jib then being substantially within the vertical projection of said trailer the improvement comprising means for removably mounting said counterweight upon said body of said jib at a position thereon located on the side of said jib supporting means remote from said chassis, so that when said counterweight is so mounted and when said jib is in said lowered generally horizontal travelling position said counterweight exerts upon said jib a torque applied about said jib supporting means as a fulcrum tending to lift said chassis, thereby to reduce the axle loading thereof, and means to transfer said counterweight between said jib and said frame.

2. A crane as claimed in claim 1, wherein said means for supporting said jib intermediate the ends thereof comprises an upwardly projecting supporting frame mounted on said trailer, means defining an upright bore in said frame, a supporting yoke, means attaching said supporting yoke to said jib at the underside thereof and a pin projecting downwards from said supporting yoke and adapted to fit in said bore.

3. A crane as claimed in claim 1, wherein said means supporting said jib intermediate the ends thereof includes a supporting yoke, means mounting said supporting yoke on said trailer for rotation about a vertical axis, and means for releaseably fixing said jib intermediate the ends thereof to said supporting yoke.

4. A crane as claimed in claim 1, further comprising at least one lifting device on said trailer for supporting said counterweight when said counterweight is released by said means for supporting said counterweight from said jib.

5. A crane as claimed in claim 4, wherein said at least one lifting device includes scissors jack means.

6. A crane as claimed in claim 1, further comprising a supporting pad at the end of said chassis adjacent said trailer, said pad being adapted to support said counterweight.

7. A crane as claimed in claim 6, further comprising a lifting device and means mounting said lifting device on said chassis adjacent said pad, said lifting device being adapted to lift said counterweight from said pad.

8. A crane as claimed in claim 1, further comprising at least one hydraulic ram, means pivotally connecting said ram to said slewing frame and to said jib for luffing said jib, said means pivotally connecting said ram to said slewing frame including a bearing and means adjustably attaching said bearing to said slewing frame whereby the position of said bearing on said slewing frame can be adjusted.

9. A crane as claimed in claim 1, further comprising a crane operator's cabin, means mounting said cabin to said chassis at a level below that of a horizontal plane swept by said jib when said jib is in a horizontal position and said slewing frame is rotated on said chassis, whereby said jib, when in said horizontal position, is able to pass over said cabin.

10. A crane as claimed in claim 9, further comprising beam means projecting from said slewing frame in a direction opposite to said jib and means for attaching said counterweight to said beam means, said beam means being located such that the horizontal plane swept by said counterweight when attached to said beam means is above said cabin whereby said counterweight is able to pass above said cabin and said jib is able to slew through a full-circle slewing movement.

* * * * *